United States Patent Office 3,232,726
Patented Feb. 1, 1966

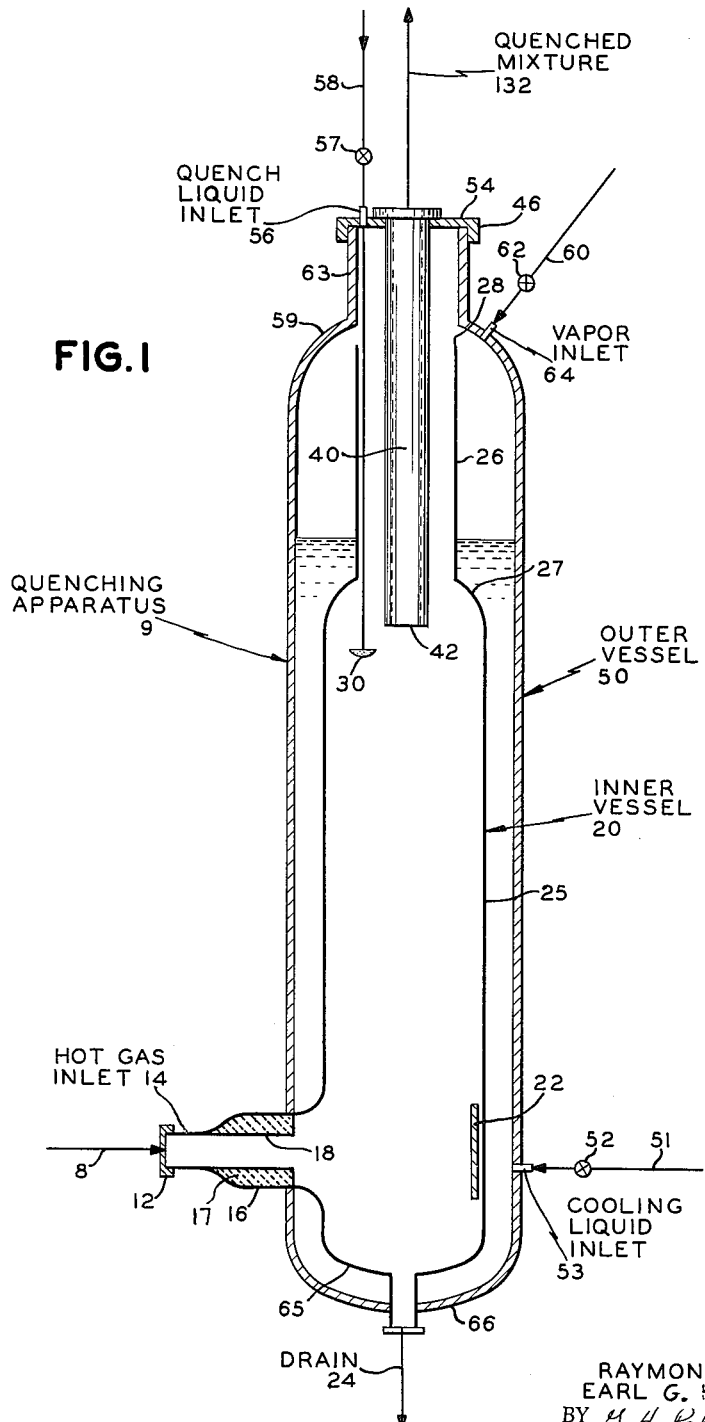

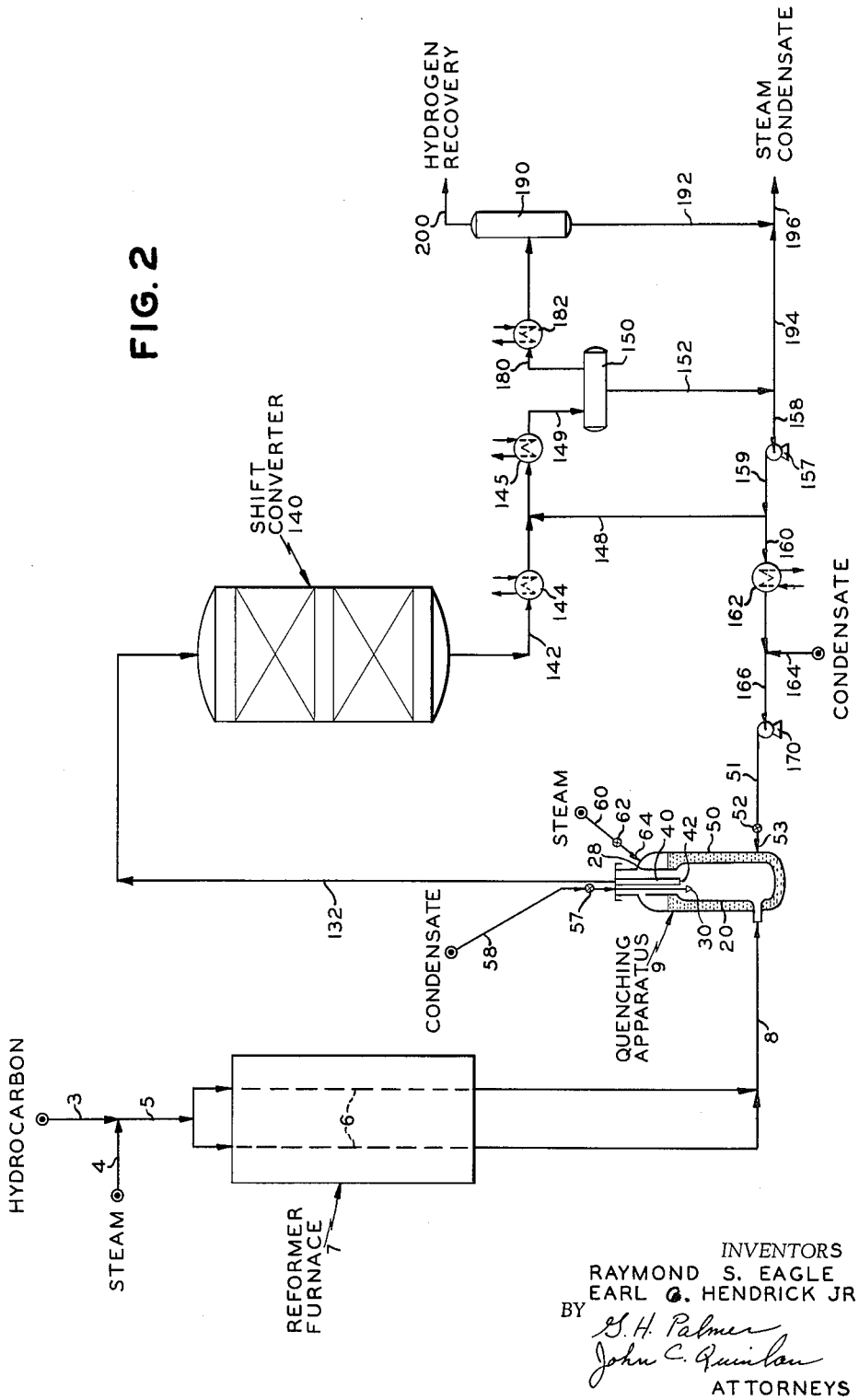

3,232,726
QUENCHING
Raymond S. Eagle, New Shrewsbury, N.J., and Earl G. Hendrick, Jr., Ossining, N.Y., assignors to Pullman Incorporated, a corporation of Delaware
Filed Mar. 28, 1962, Ser. No. 183,153
8 Claims. (Cl. 48—196)

The present invention relates to quench cooling hot gases. More particularly, it relates to a method and means for quench cooling hot gases in the production of hydrogen.

Hydrogen is produced from hydrocarbons according to one important commercial method, by reacting the hydrocarbon with steam and/or oxygen, at elevated temperatures, either in the presence or absence of a catalyst, in a gas generation zone maintained under suitable conditions to produce hydrogen and carbon monoxide, quenching the effluent of the gas generation zone, contacting the cooled effluent in the presence of a shift conversion catalyst in a shift conversion zone maintained under suitable conditions to produce carbon dioxide and additional hydrogen by the reaction of carbon monoxide and steam, cooling the effluent of the shift conversion zone to condense steam, separating uncondensed materials and steam condensate, and recovering hydrogen from the uncondensed materials. The product hydrogen is a useful raw material in a number of commercially important processes including, for example, the hydrogenation of unsaturated hydrocarbons and synthesis of methanol, hydrocarbons by Fischer-Tropsch, ammonia and urea.

As indicated, the hydrogen process includes quenching of the effluent from the gas generation zone. An efficient method of accomplishing this quenching step involves directly contacting the effluent with fluid such as a portion of the steam condensate separated from the shift converter effluent in a quench drum.

A standard quenching drum may comprise merely a metallic vessel designed according to the operating temperature and pressure employed, or it may comprise more complicated structure such as an outer metallic vessel having non-metallic insulation disposed therein.

The shortcomings of a mere metallic vessel without the benefit of some type of insulation are readily apparent in an application where a combination of conditions including high temperature and pressure and gases having a corrosive nature are employed. Temperature fluctuations at an elevated pressure result in metal fatigue and a consequent short life of such a vessel. In the above mentioned hydrogen process the ability of hydrogen gas at an elevated temperature and pressure to decarburize steel and lower its ductility presents an even greater problem of metal deterioration. Unfortunately, the use of special alloy metals is not entirely satisfactory from a technical or economic standpoint. Nor is the use of non-metallic insulation a completely satisfactory solution since such insulation is likewise subject to failure by warping, cracking, and wholesale deterioration which presents a serious problem in itself. The use of such a structure necessitates frequent process shut-down for maintenance purposes, and has in the past resulted in unexpected process delays.

To compensate for the inadequacy of insulated quenching vessels a structure has been employed using a metal liner called a shroud disposed within the insulation to protect it from thermal shock, erosion, and to prevent gas by-passing to the outer shell. The shroud is, itself, subject to rigorous conditions and such a structure does not eliminate the aforementioned problems, being furthermore expensive to maintain.

It is therefore an object of the present invention to provide a method for quenching hot gases.

Another object is to provide a method for quenching hot gases under elevated pressure.

Another object is to provide a means of quenching hot gases under elevated temperatures and pressures.

A further object is to provide method and means for quenching the effluent from a reformer furnace in the production of hydrogen in such a manner that the difficulties of the prior art and practice are overcome.

The above objects are accomplished in accordance with the present invention by contacting a hot gas with a cool quenching fluid in a quenching zone in order to reduce the temperature of the hot gaas, the quenching zone being maintained in indirect heat exchange relationship with a cooling zone in which cool liquid is maintained. A portion of the liquid in the cooling zone is vaporized by heat transfer from the quenching zone and passed to the quenching zone to provide, at least a portion of the cool quenching fluid.

The contacting step is preferably carried out on a superheated gas or vapor, although a saturated vapor can also be so contacted, at an elevated temperature and pressure for rapid cooling to facilitate further processing in standard equipment and/or to prevent further reaction. The present invention has particularly great utility in processes wherein gas quenching must be carried out under elevated pressures, as will become apparent from this disclosure.

The hot gas introduced into the quenching zone is contacted by cool quenching fluid which is supplied to the quenching zone either entirely in the vapor phase or partly as a vapor and partly as a liquid depending upon the quench cooling duty to be performed. In either case the cool fluid maintained in a region of the cooling zone performs a cooling duty corresponding to its latent heat of vaporization when by heat transfer from the quenching zone it is vaporized. The vapor so formed performs further cooling duty upon passage to the quenching zone, the further duty corresponding to the sensible heat of the vapor.

Generally, at least a portion of the cool quenching fluid is added to a quenching zone in the form of vapor generated from liquid maintained in a cooling zone. Vapor collects in a vapor containing region of the cooling zone above liquid level and flows therefrom into the quenching zone. It is often desirable to introduce additional vapor from an extrinsic source to provide additional quenching fluid or for other process purposes. The addition of vapor to a vapor containing region of the cooling zone provides a preferred method of assuring passage of vapor into the quenching zone from the cooling zone and of preventing passage of hot gas into the cooling zone; and it is an important part of the present invention that the vapor passes from the cooling zone into the quenching zone and that hot gas in the quenching zone is thereby prevented ingress into the cooling zone.

Where vaporization of the cool liquid in the cooling zone is, itself, sufficient to prevent the ingress of hot gas into the vapor containing region of the cooling zone, the cool quenching fluid can be successfully introduced as vapor directly into the quenching zone. In any case, additional cool quenching fluid is often added in liquid form directly to the quenching zone. The liquid is at least partly vaporized by contact with the hot gas and a mixture of quenched gas and quenching fluid are withdrawn from the quenching zone to be further processed. Excess liquid and vapor condensate is withdrawn from a bottom portion of the quenching zone and either recycled or removed from the system.

The quenching zone is generally at least partially confined within a surrounding cooling zone maintained in relationship with the quenching zone such that heat is readily transferred from hot gas contained within the quenching zone across the zone boundaries into cool liquid which at least partially fills the cooling zone. Provision is made so that vapor formed from the liquid as a result of the heat transfer flows into the quenching zone as previously mentioned.

Use of the quenching method of the present invention results in substantial advantages over prior quenching methods especially in high pressure processes. A major problem in the design of high pressure quenching vessels is overcome by the present invention which allows the design of a quenching vessel, the pressure shell of which is never contacted with the hot gases being quenched. Further advantage derives from the presence of cooling liquid maintained in contact with the walls of the region defined as the quenching zone. Heat transfer from the walls to the cool liquid which is vaporized thereby and replaced with more cool liquid maintains a reasonably low wall temperature and tends to erase the temperature gradient and thermal fluctuations in the walls of the quench vessel. Other advantages will become apparent from the further description and disclosure.

In order to provide a better understanding of the present invention, reference is had to the two figures of the drawing.

FIGURE 1 shows diagrammatically in elevation a vapor quench vessel employed in carrying out the process of the present invention.

FIGURE 2 shows in diagrammatic form a process for making hydrogen from steam and hydrocarbon, wherein the effluent from a reformer furnace is quenched in accordance with one embodiment of the method of the present invention.

Vapor quenching apparatus 9 shown in FIGURE 1 comprises in combination outer pressure vessel 50 adapted with appropriate means for ingress and egress of fluids and inner vessel 20 disposed within outer vessel 50, inner vessel 20 likewise being adapted with appropriate fluid flow means as later described herein.

Inner vessel 20 is shown in FIGURE 1 in a preferred embodiment thereof as a vertically disposed, elongated vessel being cylindrical in shape. Generally, the shape of vessel 20 is made in accordance with that of outer vessel 50 to provide sufficient volume for liquid within vessel 50. Vessel 20 has a bottom portion 65, which is shown as dish-shaped although coned- or hemispherical-shaped heads are suitable, which bottom portion is adapted by means of drain 24 for the removal of liquid in vessel 20. Vessel 20 shown in FIGURE 1 has an elongated cylindrical intermediate portion 25, adapted with hot gas inlet means 14 and an upper portion 26, which is reduced in diameter and communicates with intermediate portion 25 through shoulder 27. The top portion of vessel 20 is in open communication with outer vessel 50 through open end 28, thereby providing a passage for vapors in outer vessel 50 into inner vessel 20.

The walls of inner vessel 20 are designed essentially independently of operating pressure for reasons which are made apparent later herein.

Outer vessel 50 is adapted to receive dipleg 40, or other suitable means of withdrawing gas from inner vessel 20.

Dipleg 40 extends vertically downward from the cover portion of outer vessel 50 to within inner vessel 20 wherein it terminates in open communication with inner vessel 20 through open end 42, thereby providing an upward passage for quenched gas mixture. The cover portion of outer vessel 50 is also adapted to receive liquid inlet 56 which, likewise, extends vertically downward into inner vessel 20 terminating in spray nozzle 30 or a plurality thereof.

Outer vessel 50 is a pressure vessel, preferably an elongated, vertically disposed vessel, cylindrical in shape, having dished, coned, or hemispherical shaped bottom 66 adapted to receive drain 24. A lower portion of vessel 50 is adapted to receive hot gas inlet means 14, which passes through to inner vessel 20. Another portion, preferably a lower portion of vessel 50 is adapted with cooling liquid inlet means 53. A reduced diameter portion 63 connects covering means 54 with the elongated major portion of outer vessel 50 through shoulder 59. Covering means 54 comprises removable flanged cover 46 or other suitable covering means.

Generally, outer vessel 50 is designed as a function of operating pressure employed therein whereas inner vessel 20 is designed independently of pressure. Thus, for high operating pressures the wall thickness of vessel 50 is generally considerably greater than that of vessel 20.

In the operation of the vapor quenching apparatus shown in FIGURE 1, hot gas is introduced by means of hot gas inlet 14 from process line 8 into a lower portion of inner vessel 20 for countercurrent quenching with quench fluid introduced to the upper portion of vessel 20. Co-current quenching is had in the present apparatus by introducing hot gas as well as quenching fluid through upper portions of the quenching apparatus.

The hot gas inlet means 14 comprises fitting 12, which connects process line 8 to the gas inlet means, and inner casing 18 and outer wall 16 having ceramic insulation 17 sandwiched therebetween. Inner casing 18 is subjected to elevated temperatures and is preferably made of a high temperature alloy.

Wear plate 22 is situated on a lower portion of the wall of inner vessel 20 opposite from the hot gas inlet to prevent erosion of the inner vessel wall and local overheating of inner vessel 20 by the hot gas entering the vessel at a high velocity and a high temperature. The hot gas contained within expanded portion 25 is contacted with cool vapor which makes its ingress from outer vessel 50 through upper open end 28 and in most operations also with cool liquid from spray nozzle 30.

Liquid sprayed into inner vessel 20 from spray nozzle 30 is provided by means of line 58 which is received through the cover portion of vessel 50 by inlet means 56. Valve 57 situated in line 58 is employed to control the flow rate of liquid; and to shut-off the liquid entirely when operation is such that the entire quench duty is provided by vaporous quenching fluid. Excess quenching liquid or vapor condensate is withdrawn through drain 24 at the bottom of inner vessel 20.

Vapor which makes ingress into inner vessel 20 and therein performs at least a part of the whole quenching is derived in part from liquid contained within a lower portion of outer vessel 50 as later described herein; and is introduced in part into the upper portion of outer vessel 50 by vapor inlet means 64 situated within the shoulder 59. Vapor at a suitable pressure is provided by means of line 60 and the flow thereof is adjusted to the appropriate rate by means of valve 62.

Generally, vapor flow through inlet 64 is adjusted to maintain the region of outer vessel 50 which is above liquid level at a reasonably low temperature in consideration of the metal employed. This is especially important during start up and shut down because of liquid deficiency in vessel 50 at those times. In certain processes such as the hydrogen process hereinafter described control is maintained over the influx of steam through inlet 64 such that a given hydrocarbon to water ratio is achieved for subsequent shift conversion.

During continuous operation, the operating pressure of the vapor above the liquid in outer vessel 50 is generally greater than the working pressure of the gas within inner vessel 20 by virtue of continuous vaporization of such liquid as a result of heat transferred from hot gas in inner vessel 20. Hot gas in inner vessel 20 is thereby prevented egress to outer vessel 50 and generated vapor makes ingress into inner vessel 20 through open end 28. The difference in pressure between the outer and the inner vessel needs to be large enough to achieve the desired direction of gas flow into the inner vessel 20. Since this pressure difference is not great and since inner vessel 20 is in open communication with outer vessel 50, it is not necessary to design the walls of inner vessel 20 to withstand elevated pressure. Furthermore, the design is independent of the operating pressure employed.

The design of the walls of the outer vessel 50 is, as previously mentioned a function of the operating pressure employed. In distinction to prior vessels, however, the pressure walls are protected from contact with the hot gas being quenched by reason of cool liquid in the lower portion of and cool vapor in the upper portion of outer vessel 50. The cool liquid and vapor are particularly effective in maintaining a low temperature and in eliminating the effect of the large temperature gradient in the quenching zone on the walls of outer vessel 50 and also inner vessel 20.

As was previously mentioned, a portion of the vapor which makes ingress into inner vessel 20 is derived from liquid contained in a lower portion of outer vessel 50 surrounding a portion of inner vessel 20. Heat is transferred from the hot gas in inner vessel 20 through the walls of that vessel into the liquid contained within outer vessel 50 thereby causing at least a portion of that liquid to vaporize. As the liquid vaporizes, it is replenished with liquid introduced into outer vessel 50 through liquid inlet means 53. Liquid is supplied to the inlet by means of line 51 at a rate controlled by valve 52.

Liquid level in outer vessel 50 is generally maintained safely between shoulder 27 and upper end 28 of reduced diameter section 26 by adjusting the input through valve 52 to the rate of vaporization. The reduction in diameter of the upper portion of inner vessel 20 aids in stabilizing the liquid level. It is not necessary that the reduction in diameter be of any particular design or shape such as the uniform reduced diameter portion 26.

Vapors formed from the liquid flow upwardly through the passage formed between upper end 28 and shoulder 59. It is preferred that this passage be as narrow as possible commensurate with the quantity of vapor which must pass through it to maintain a high vapor velocity which further protects outer vessel 50.

A mixture of quench cooled gas and vapors within inner vessel 20 is withdrawn in line 132 to further processing at open end 42 of dipleg 40 which extends into vessel 20, or by other suitable gas removal means.

Reference is now had to FIGURE 2 wherein the novel quenching method and means is described with reference to a specific example of its use in a process for the production of hydrogen.

Feed hydrocarbon and steam are introduced respectively through lines 3 and 4. The combined stream in line 5 is passed through a plurality of fired tubes 6 disposed in the radiant section of reformer furnace 7. The fired tubes 6 are packed with suitable steam reforming catalyst which promotes reaction of the feed materials to form hydrogen and carbon monoxide. A fuel is burned, by means not shown, externally of the tubes 6 in furnace 7 to provide the required heat for the endothermic reforming reaction in tubes 6.

The hot effluent of furnace 7 containing appreciable amounts of hydrogen and carbon monoxide is passed through line 8 to quenching apparatus 9 wherein the hot reformer effluent is cooled and the hydrocarbon to water ratio thereof is adjusted to suitable levels for subsequent shift conversion.

An example of the composition of a hot reformer effluent entering inner vessel 20 from line 8 is shown in Table 1 below:

TABLE 1

*Reformer effluent composition*

| Material: | Amount, mols./hour |
|---|---|
| $H_2$ | 1138.4 |
| $N_2$ | 0.1 |
| CO | 245.0 |
| $CO_2$ | 111.2 |
| $CH_4$ | 103.0 |
| $H_2O$ | 569.4 |
| Total | 2167.1 |

The reformer effluent is at an elevated temperature generally between about 1000° to about 2000° F. under an elevated pressure generally between about 50 to about 250 p.s.i.g. The effluent must be reduced in temperature for easier handling and for subsequent shift conversion, which also requires additional steam. Both ends are achieved in quench apparatus 9 wherein hot effluent is directly contacted by liquid water introduced to inner vessel 20 from showerhead 30 at the terminal portion of line 58 having valve 57 situated thereon and by steam which enters inner vessel 20 from outer vessel 50 by means of upper open end 28. The effluent is quench cooled by direct heat interchange with the steam and water which vaporizes and by indirect heat exchange with liquid water surrounding inner vessel 20, a mixture of quenched gas and vapor being thereafter withdrawn to line 132 through open end 42 of dipleg 40.

Steam provided in line 60 beyond valve 62 is introduced into an upper portion of outer vessel 50 through inlet 64 at a pressure greater than the pressure within inner vessel 20 so that it flows into the inner vessel. The water introduced in line 58 is preferably steam condensate withdrawn from process or otherwise pretreated water to prevent scale formation in inner vessel 20. Steam is also produced from water contained within outer vessel 50 and likewise flows into inner vessel 20. Water is provided to outer vessel 50 at a rate controlled by valve 52 in lines 53 and 51 as further described herein.

An example of the several streams and conditions associated therewith entering and leaving quenching apparatus 9 is shown in Table 2 below:

TABLE 2

| Line | 8 | 60 | 51 | 58 | 132 |
|---|---|---|---|---|---|
| Pressure, p.s.i.g | 125 | 180 | | | 124 |
| Temperature, °F | 1,545 | 380 | 260 | 260 | 650 |
| Phase | Gas | Saturated vapor | Liquid | Liquid | Gas |
| Quantity, lbs./hour | 25,926 | 9,630 | 3,770 | 7,530 | 46,856 |

In the example shown in Table 2 a major portion of the quench duty is performed by liquid water introduced through line 58, the remaining duty being performed by liquid from line 51 and steam from line 60. It is important to note, however, that successful quenching is achieved in accordance with the present invention by operating according to modifications such as the following. For example, the entire quenching duty is performed by steam introduced from line 60 and steam produced by means of indirect heat exchange between hot gas and liquid in vessel 50, valve 57 being closed so that no liquid enters vessel 20 from line 58. Successful continuous operation is also achieved where valve 62 is closed to shut off the flow of steam in line 60 the entire quench duty being performed by liquid introduced from line 58 and steam produced by means of indirect heat exchange as described above.

The novel apparatus shown in FIGURE 1 is preferred for carrying out the quenching method of the present invention, but any suitable quenching means may be employed.

The cooled gaseous mixture is removed from inner vessel 20 for quenching apparatus 9 by means of dipleg 40 and passed by means of line 132 to shift converter 140. It is important to note that the addition of steam to the hydrogen mixture being quenched in quenching apparatus 9 favors the production of hydrogen in the subsequent shift conversion step; and it is an important advantage of the present invention is shown by the example that sufficient steam is provided to meet the steam requirements of shift converter 140. The reaction of steam and carbon monoxide in the cooled reformer effluent is promoted by contacting the effluent with a suitable shift conversion catalyst in shift converter 140.

The effluent of shift converter 140 is withdrawn through line 142 and cooled to condense steam. The cooling is done by a combination of indirect heat exchange in heat exchangers 144 and 145 with cooler fluids and of direct heat exchange with relatively cold circulating steam condensate, supplied through line 148. As a result of this cooling, the shift converter effluent which is finally introduced into separation drum 150 from line 149 is partially condensed. Steam condensate is separated in drum 150, withdrawn through line 152 and recirculated in part to lines 160 and 148 through line 159 and 158 by means of pump 157.

Steam condensate in line 160 is passed through heat exchanger 162 wherein the temperature of the steam condensate is adjusted to the desired temperature for use in quenching apparatus 9. Additional water is added in line 166 from 164, when needed, pressurized by means of pump 170 and passed to inlet 53 through line 52 having valve 52 situated thereon. Water added at this point is also preferably pretreated by distillation or other methods to prevent scale build up in outer vessel 50.

The uncondensed material separated in drum 150 is withdrawn through line 180, further cooled by indirect heat exchange with a colder fluid in heat exchanger 182 and passed to a separation drum 190. Additional steam is condensed by this further cooling and additional steam condensate separates in drum 190. The latter is withdrawn by means of line 192, combined with that portion of the condensate from line 152 which is in line 194 and delivered from the process through line 196. Uncondensed material separated in drum 190 is withdrawn therefrom in line 200 and is delivered from the process as the hydrogen-rich product. Depending upon the purity requirements for the hydrogen produced by the process, the hydrogen-rich fraction in line 200 can be used directly or after further purification.

Having thus described the invention by reference to a specific example thereof it is to be understood that many modifications and alterations will become apparent to those skilled in the art without departing from the scope of the present invention. For example, the present invention is useful in quenching the hot gaseous effluent from numerous reactions carried out in the petroleum and chemical fields and is not limited to use in quenching hydrogen effluents of any set composition. It is also to be understood that the present invention is not limited to specific dimensions and sizes and such changes may be made without departing from the scope of the invention.

What is claimed is:

1. A method for quenching a hot hydrogen containing gas which comprises introducing said gas maintained under an elevated working pressure into a primary zone, directly contacting said gas with water in said primary zone to quench cool said gas, said primary zone being maintained in indirect heat exchange relationship with a second zone, maintaining liquid water at a defined level in the lower portion of said second zone superimposed by a vapor space such that liquid water is prevented from flowing into said primary zone from said secondary zone, vaporizing at least a portion of said liquid water and forming steam therefrom in said second zone by heat transfer from said primary zone, introducing steam maintained under a pressure greater than said working pressure into the vapor space in said second zone, passing said steam and steam formed within said second zone to said primary zone to provide at least a portion of said water and withdrawing quenched gas and steam from said primary zone.

2. The process of claim 1 wherein the liquid in said second zone is replenished by introducing liquid directly into said second zone.

3. The process of claim 1 wherein a first portion of said water is provided by water introduced to said primary zone as vapor from said secondary zone and a remaining portion of said water is provided by water introduced to said primary zone in a dispersed liquid phase.

4. A quenching apparatus which comprises in combination a pressure vessel having relatively thick walls designed to withstand a designated operating pressure and a confined vessel disposed within said pressure vessel said confined vessel having thin walls relative to said pressure vessel being designed independently of operating pressure, the walls of said confined vessel being in spaced relationship with the walls of said pressure vessel thereby defining a passage for liquid contained within said pressure vessel and surrounding a substantial portion of said confined vessel, the top portion of said confined vessel being in open communication with an upper portion of said pressure vessel thereby providing a vapor passage from said pressure vessel to said confined vessel, cover means for said pressure vessel secured to an upper portion thereof, gas withdrawing means extending through said cover means downward to at least within the upper portion of said confined vessel thereby providing an upward passage for quenched gases, means for introducing hot gas to be quenched into a lower portion of said confined vessel, and means for introducing liquid quenching fluid into said confined vessel.

5. A method for quenching a hot gas which comprises introducing said gas maintained under an elevated working pressure into a primary zone, directly contacting said gas with a quench liquid in said primary zone to quench cool said gas, said primary zone being maintained in indirect heat exchange relationship with a second zone, maintaining in said second zone a liquid at a defined level in a lower portion superimposed by a vapor space in the upper portion, vaporizing a portion of the liquid in said second zone by heat transfer from said primary zone to provide vapor at a higher pressure than the pressure in said primary zone and passing same from the vapor space in said secondary zone into said primary zone to provide further quenching therein and withdrawing quenched gas and vapors from said primary zone.

6. A method which comprises reacting hydrocarbon feed material and steam in the presence of a steam reforming catalyst under an elevated temperature and pressure to provide a reaction effluent containing hydrogen and carbon monoxide, introducing said effluent into a primary zone, directly contacting said effluent with water in said primary zone to quench cool said effluent, said primary zone being maintained in indirect heat exchange relationship with a second zone, maintaining in said second zone liquid water at a defined level in the lower portion superimposed by a vapor space in the upper portion such that said liquid is prevented from flowing into said primary zone from said secondary zone, vaporizing at least a portion of said water in said secondary zone by heat transfer from said primary zone to provide vapor at a higher pressure than the pressure in said primary zone; and passing same from the vapor space in said second zone into said primary zone to provide further quenching therein, withdrawing the thusly-cooled effluent and steam to a shift conversion zone, and reacting carbon monoxide contained in said effluent and steam in the presence of a suitable catalyst to obtain an effluent which contains hydrogen and unreacted steam.

7. The process of claim 6 in which steam in the effluent of said shift conversion is condensed and re-introduced as liquid into said second zone.

8. A quenching apparatus which comprises in combination a normally vertically disposed elongated pressure vessel having relatively thick walls designated to withstand a designated operating pressure and an elongated confined vessel disposed within said pressure vessel having thin walls relative to said pressure vessel designed independently of operating pressure, the walls of said confined vessel being in spaced relationship with the walls of said pressure vessel thereby providing a passage for liquid contained within said pressure vessel, the top portion of said confined vessel being in open communication with an upper portion of said pressure vessel thereby providing a vapor passage from said pressure vessel to said confined vessel, hot gas inlet means associated with a lower portion of said confined vessel and passing through the walls of said pressure vessel, said confined vessel being reduced in diameter within an upper portion thereof to provide a means of stabilizing liquid level within said confined space, said pressure vessel having liquid inlet means in a lower portion thereof and vapor inlet associated with an upper portion thereof, said pressure vessel having a cover portion adapted to receive quench liquid inlet means which extend downward into said confined vessel and further adapted to receive gas withdrawing means, said gas withdrawing means extending from the cover portion of said pressure vessel to at least within the reduced diameter portion of said confined vessel thereby providing an upward passage for quenched gas.

References Cited by the Examiner
UNITED STATES PATENTS

| | | | |
|---|---|---|---|
| 856,048 | 6/1907 | Gaillard | 261—152 |
| 949,217 | 2/1910 | Caps | 55—222 |
| 2,498,924 | 2/1950 | Keller | 261—160 |
| 2,817,326 | 12/1957 | Eastman et al. | 48—196 |
| 2,852,345 | 9/1958 | Rushford | 23—259.5 X |
| 3,150,931 | 9/1964 | Frank | 23—213 |

MORRIS O. WOLK, *Primary Examiner.*

HERBERT L. MARTIN, *Examiner.*